United States Patent
Barron

(10) Patent No.: US 10,696,253 B2
(45) Date of Patent: Jun. 30, 2020

(54) VEHICLE FRONTAL SAFETY GUARD

(71) Applicant: Public Transportation Safety Int'l Corp., Los Angeles, CA (US)

(72) Inventor: Mark B. Barron, Bel Air, CA (US)

(73) Assignee: PUBLIC TRANSPORTATION SAFETY INT'L, Los Angeles, CA (US)

( * ) Notice: Subject to any disclaimer, the term of this patent is extended or adjusted under 35 U.S.C. 154(b) by 175 days.

(21) Appl. No.: 16/038,902

(22) Filed: Jul. 18, 2018

(65) Prior Publication Data

US 2020/0023796 A1    Jan. 23, 2020

(51) Int. Cl.
| | | |
|---|---|---|
| B60R 19/03 | (2006.01) | |
| B60R 19/12 | (2006.01) | |
| B60R 19/48 | (2006.01) | |
| B60R 19/26 | (2006.01) | |
| B60R 19/00 | (2006.01) | |

(52) U.S. Cl.
CPC .............. *B60R 19/12* (2013.01); *B60R 19/26* (2013.01); *B60R 19/48* (2013.01); *B60R 2019/002* (2013.01)

(58) Field of Classification Search
CPC ......... B60R 19/52; B60R 19/44; B60R 19/56; B60R 19/48; B60R 2021/0039; B60R 21/34; C08L 23/02; B60N 2/42736; B60N 2/4235; B62D 21/152
USPC ......................................................... 293/120
See application file for complete search history.

(56) References Cited

U.S. PATENT DOCUMENTS

| | | | |
|---|---|---|---|
| 1,411,254 A | | 4/1922 | Braucci |
| 1,805,933 A | | 4/1930 | Victor |
| 2,605,119 A | | 7/1952 | Earnest |
| 3,236,552 A | * | 2/1966 | Percifull ................ B60R 21/34 293/9 |
| 4,559,518 A | * | 12/1985 | Latta, Jr. ................ B60Q 1/50 116/28 R |
| 4,582,351 A | * | 4/1986 | Edwards ................ B60R 19/56 293/102 |
| 4,641,870 A | * | 2/1987 | Heyman ................ B60R 19/44 293/102 |
| 4,683,974 A | | 8/1987 | Richardson |
| 4,688,824 A | * | 8/1987 | Herring .................. B60R 21/34 280/762 |
| 4,697,541 A | * | 10/1987 | Wicker .................... B60Q 1/50 116/28 R |
| 4,705,136 A | * | 11/1987 | Godsoe, Sr. ........... B60K 28/00 180/271 |
| 4,877,266 A | * | 10/1989 | Lamparter ............. B60R 19/56 280/762 |

(Continued)

*Primary Examiner* — Kiran B Patel
(74) *Attorney, Agent, or Firm* — Diederiks & Whitelaw, PLC.

(57) ABSTRACT

A frontal safety guard which functions to prevent objects lying in the path of a vehicle, such as a school bus, from entering beneath the vehicle for safety purposes includes a central guard portion hingedly connected to the bumper such that the central guard portion can pivot, against a biasing force, relative to the bumper, and side extensions hingedly interconnected to and extending laterally from opposing end portions of the central guard portion such that the side extensions can pivot in unison with the central guard portion relative to the bumper and also individually pivot relative to both the bumper and the central guard portion.

19 Claims, 7 Drawing Sheets

(56) References Cited

U.S. PATENT DOCUMENTS

| | | | |
|---|---|---|---|
| 4,956,630 A * | 9/1990 | Wicker | B60Q 1/52 |
| | | | 116/28 R |
| 5,132,662 A * | 7/1992 | Burch | B60Q 1/50 |
| | | | 180/271 |
| 5,148,886 A | 9/1992 | Parsons | |
| 5,226,686 A * | 7/1993 | Triggs | B60Q 1/50 |
| | | | 116/280 |
| 5,357,239 A * | 10/1994 | Lamparter | B60Q 1/50 |
| | | | 318/281 |
| 5,406,251 A * | 4/1995 | Leis | B60Q 1/50 |
| | | | 116/39 |
| 5,462,324 A * | 10/1995 | Bowen | B60R 21/34 |
| | | | 293/15 |
| 5,564,359 A * | 10/1996 | Harder | B60R 21/34 |
| | | | 116/28 R |
| 5,735,560 A | 4/1998 | Bowen et al. | |
| 5,802,746 A * | 9/1998 | Miller | E01H 5/065 |
| | | | 172/833 |
| 5,860,385 A * | 1/1999 | Lamparter | B60R 21/34 |
| | | | 116/28 R |
| 6,396,395 B1 * | 5/2002 | Zielinski | B60Q 1/50 |
| | | | 180/271 |
| 6,477,978 B2 * | 11/2002 | Lamparter | B60R 21/34 |
| | | | 116/28 R |
| 7,832,762 B2 | 11/2010 | Breed | |
| 8,505,943 B2 | 8/2013 | Barron | |
| 8,950,800 B1 * | 2/2015 | Farooq | B60R 21/34 |
| | | | 296/187.04 |
| 9,004,554 B2 | 4/2015 | Barron | |
| 9,308,880 B1 | 4/2016 | Johnson | |
| 9,676,367 B2 | 6/2017 | Barron | |
| 2005/0253693 A1 | 11/2005 | Rennick et al. | |
| 2011/0018289 A1 * | 1/2011 | Barron | B60R 19/54 |
| | | | 293/58 |
| 2012/0248799 A1 * | 10/2012 | Barron | B60R 19/54 |
| | | | 293/58 |
| 2012/0286528 A1 * | 11/2012 | Barron | B60R 21/34 |
| | | | 293/58 |
| 2014/0339800 A1 | 11/2014 | Siddons | |
| 2016/0031409 A1 * | 2/2016 | Barron | B60R 21/34 |
| | | | 293/58 |
| 2016/0347270 A1 * | 12/2016 | Higashimachi | B60R 19/04 |
| 2017/0088091 A1 * | 3/2017 | Ginn | B62D 35/005 |
| 2017/0197572 A1 * | 7/2017 | Fabiano | B60R 19/023 |
| 2017/0210320 A1 * | 7/2017 | Prevor | B60R 19/023 |
| 2017/0274865 A1 * | 9/2017 | Barron | B60R 19/54 |
| 2018/0056926 A1 * | 3/2018 | Barron | B60R 21/34 |
| 2018/0290602 A1 * | 10/2018 | Wheeler | B60R 11/06 |

* cited by examiner

VEHICLE FRONTAL SAFETY GUARD

BACKGROUND OF THE INVENTION

Field of the Invention

The present invention pertains to the art of vehicle safety devices and, more particularly, to a safety device mounted to and extending downward from a front bumper of a vehicle for engaging animate and inanimate objects in order to prevent the objects from going under the vehicle. Overall, the safety device includes a central guard portion, which is pivotally attached to and extends down from a front bumper to just above a vehicle support surface, and side extensions which are mounted for pivotal movement both in unison with the central guard portion relative to the bumper, or relative to both the central guard portion and the bumper.

Discussion of the Prior Art

For a range of reasons, various transportation vehicles are designed with rather high ground clearances. For instance, school buses can have associated high ground clearances. Unfortunately, there are inherent dangers associated with the operation of vehicles with high ground clearances that are not found in other vehicles which have low ground clearances. The most serious of these injuries is a result of an individual slipping and falling in the road in front of a bus, resulting in the bus running over the individual. In addition, inanimate objects can undesirably run over and crushed by such a bus.

Although there exist vehicle safety guards, there is still seen to exist a need for a frontal safety guard which exhibits enhanced mounting and operation, thereby establishing an effective, potentially lifesaving safety system for use on a wide range of vehicles having rather high ground clearances.

SUMMARY OF THE INVENTION

The present invention is directed to providing a frontal safety guard mounted to and extending downward from a front bumper of a vehicle, such as a high clearance school bus, wherein the frontal safety guard functions to prevent objects from going under the vehicle. The frontal safety guard includes a central guard portion, which is attached to and extends down from the front bumper to just above a vehicle support surface, e.g. in the range of about 3 inches from the support surface, and side extensions which are mounted to the central guard portion for extension laterally beyond the vehicle body. Overall, the frontal safety guard functions to engage individuals or other animate objects lying in the path of the vehicle, thereby preventing the individuals or other animate objects from being run over by the vehicle.

More specifically, the central guard portion is pivotally attached to and extends down from a front bumper to just above a vehicle support surface such that the entire frontal safety guard can pivot, generally about a first axis and against a biasing force, relative to the bumper if the safety guard engages an extremely heavy or fixed object, such as a curb, thereby avoiding undue damage to the safety guard. In addition, the frontal safety guard includes side extensions which can pivot against biasing forces about respective second and third axes, such as axes extending substantially perpendicular to the first axis, relative to both the central guard portion and the bumper. When the vehicle is headed in a straight forward path, the side extensions extend laterally outward of the front steerable wheels of the vehicle such that, when the wheels are turned to direct the vehicle either left or right, the respective side extension still projects across at least a majority of the wheel.

With this construction, an individual who slips and falls in front of the vehicle or a large inanimate object located in the vehicle's path will engage the frontal safety guard and be prevented from going completely under the vehicle. The frontal guard is actually biased against rearward pivotal movement about a substantially horizontal axis, thereby establishing a dampening effect which not only enhances safety for the individual by providing a certain degree of cushioning but also minimizes damage to the frontal safety guard when the guard encounters a heavy or fixed object. In addition, the separate pivotal mounting of each side extension about a substantially vertical axis, along with the lateral extension of each side extension, functions to prevent individuals from getting under a respective front steerable wheel of the vehicle. In a preferred form, each side extension includes a terminal end portion having a rearwardly curved configuration such that the side extension will actually deflect an animate or inanimate object laterally outward and away from a respective front vehicle wheel.

The overall frontal safety guard system can be provided with additional safety control elements, such as in the form of motion or visual (camera) sensors, warning lights, warning speaker, microphone, radar, and the like, to further add to the overall effectiveness of the system. In addition, provisions are made, at least in accordance with certain embodiments of the invention, to provide for readily, selectively detaching the frontal safety guard from the vehicle bumper, such as through the use of manual, quick disconnect mechanisms. Certainly, while the invention has particular utility in school buses, it can also be used to prevent injuries in a wide range of vehicles having high frontal ground clearances. In any case, additional objects, features and advantages of the present invention will become more readily apparent from the following detailed description of preferred embodiments when taken in conjunction with the drawings wherein like reference numerals refer to corresponding parts in the several views.

DETAILED DESCRIPTION OF THE INVENTION

Figure 1:
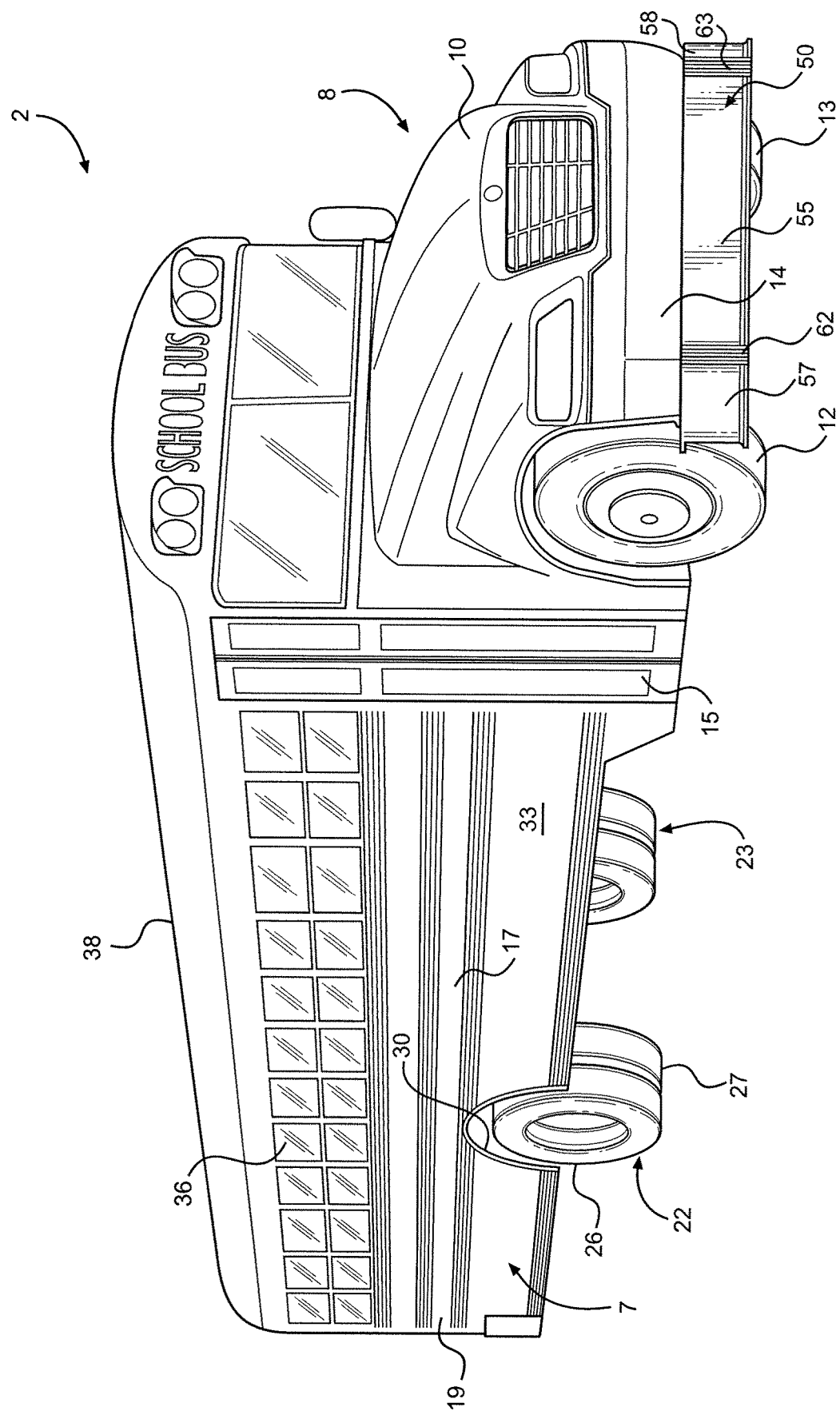
FIG. 1 is a perspective view of a school bus having mounted thereto a frontal safety guard assembly in accordance with an embodiment of the invention.

With initial reference to FIG. 1, a vehicle 2, shown as a school bus, including a body 7 having a front end 8 including a hood 10 beneath which is provided an engine (not shown), front steerable wheels 12 and 13, and a front bumper 14. Behind front wheels 12 and 13 is shown a forwardmost side door 15 which leads to a middle section 17 of vehicle body 7 and a rear end section 19. Supporting rear end section 19 is a pair of rear wheel assemblies 22 and 23. Each rear wheel assembly 22, 23 is shown to include dual wheels 26 and 27 arranged in a wheel well 30 created in a side panel 33 of vehicle body 7. Also provided in side panel 33 are various fore-to-aft spaced windows 36 which are vertically arranged below a roof 38. More importantly, in accordance with the present invention, a frontal safety guard 50 is shown fixed to and extending downward from bumper 14. As will be detailed more fully below, frontal safety guard 50 includes a central portion 55 and a pair of spaced side extensions 57 and 58, with bellow or accordion members 62 and 63 shown interposed between central portion 55 and spaced side extensions 57 and 58, respectively.

Although also applicable to more low riding buses, the frontal safety guard 50 of the invention is considered to be particularly advantageously employed in connection with vehicles which have undercarriage body portions that are raised quite high, such as many school buses like vehicle 2. In rather high ground clearance vehicle 2, the ground clearance of bumper 14 can be even up to two feet, while the frontal safety guard 50 of the invention reduces this distance to in the order of 2-6, and preferably about 3, inches. In any case, in connection with the invention, it should be noted that the overall safety guard 50 is formed from multiple, interconnected pieces which are hingedly mounted in front of vehicle 2. The frontal safety guard 50 is preferably formed of plastic, rubber, urethane or the like, although other known materials could be used to create a physical barrier strong enough to prevent a child or adult from going under body 17 between front wheels 12 and 13, with a highly durable, impact resistant urethane material that is abrasion resistant, corrosion proof, smooth to the touch and color fast, being preferred. In addition, it would be possible to manufacture at least a portion of frontal guard 50 from recycled tire rubber or fiberglass. To reduce the weight and thickness of frontal guard 50, it is possible to employ an inner wire mesh for internal strengthening without sacrificing overall effectiveness.

Figure 2:
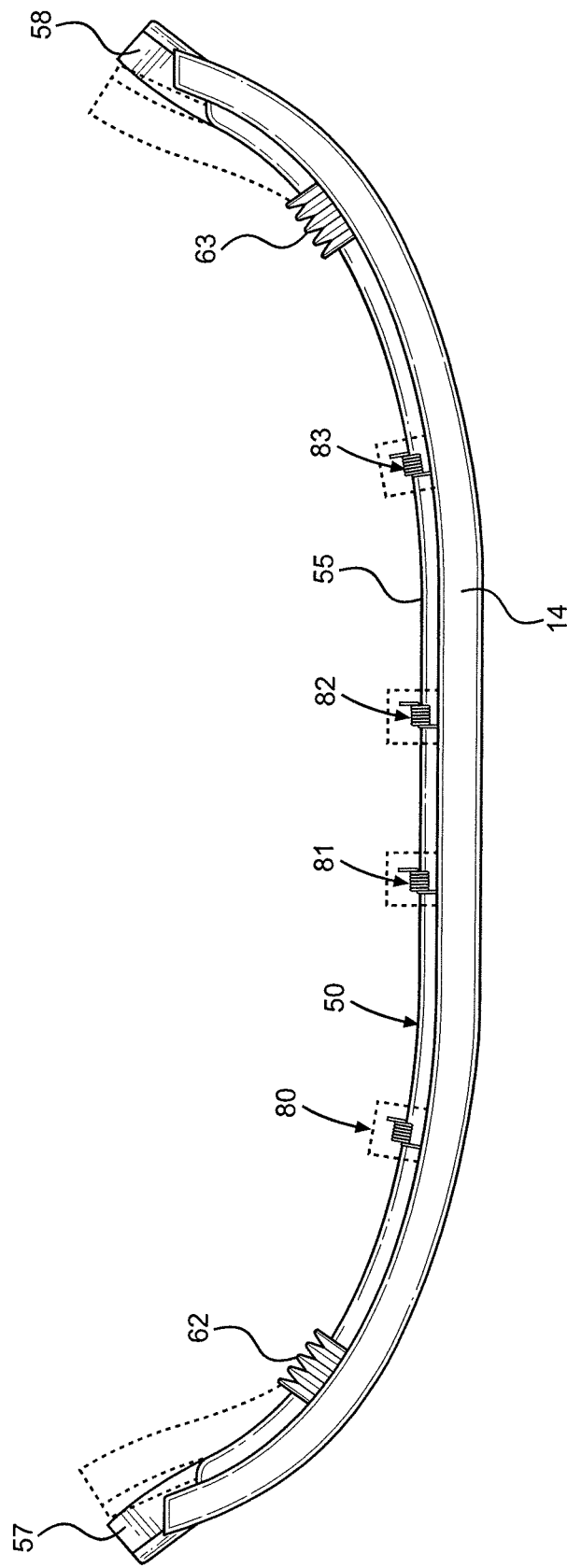
FIG. 2 is a top view of a front bumper of the school bus of FIG. 1 with the frontal safety guard mounted thereto.
Figure 3:
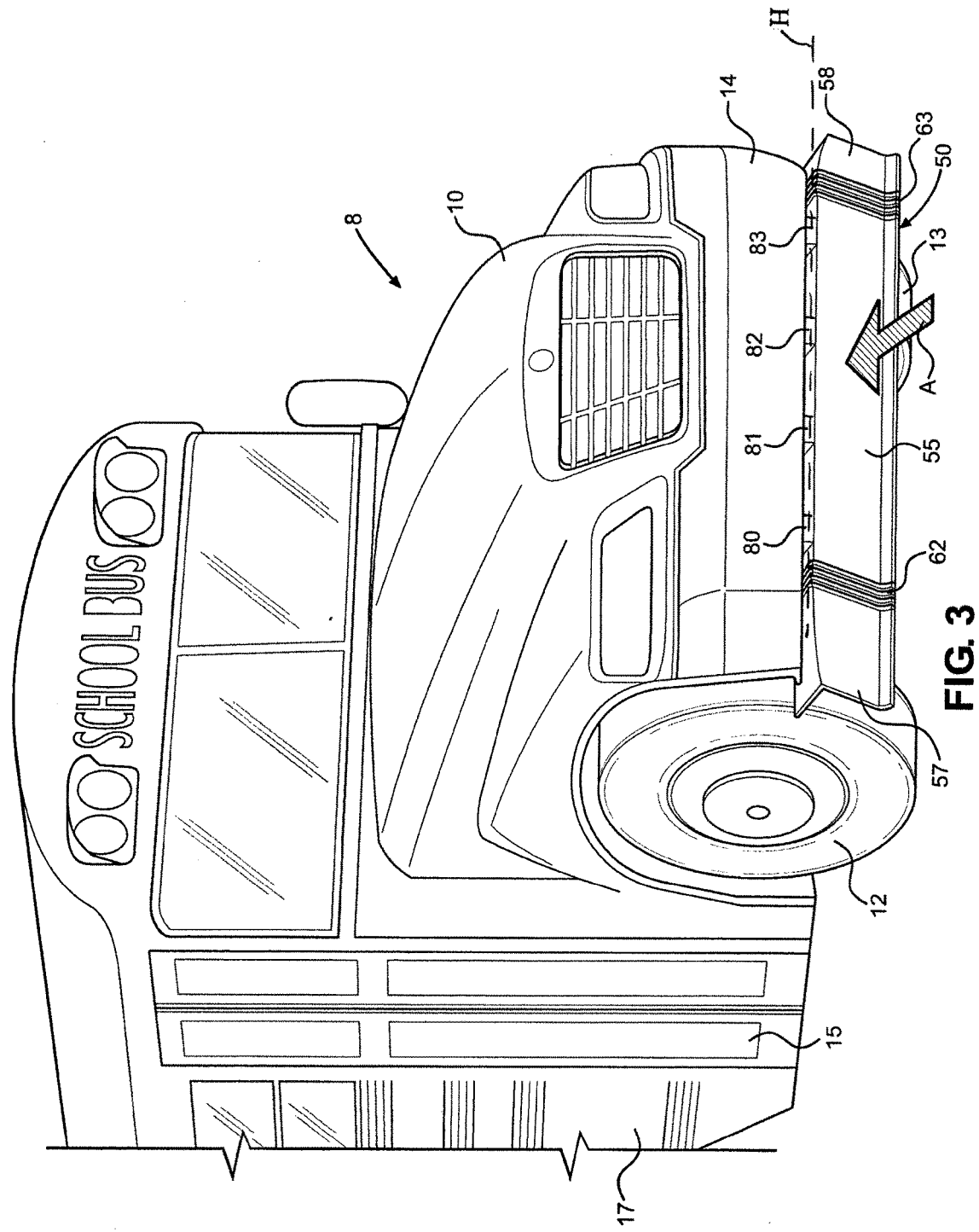
FIG. 3 is a perspective view of a front portion of the school bus of FIG. 1 with the frontal guard piece being deflected upon impact with a fixed object.

FIG. 2 is a top view, showing front bumper 14 of the school bus 2 with the frontal safety guard 50 mounted thereto. In particular, this figure shows hinged mounting assemblies 80-83, each of which includes a pair of hinged plates with one plate being attached to or integrated as part of the frontal safety guard 50 and the other (shown shortened and in dotted to expose additional structure) bolted or otherwise secured to bumper 14. Particularly important in connection with this mounting is that the plates are hinged together and biased by respective springs, such that the springs constitute biasing members. The hinge axes of mounting assemblies 80-83 are generally horizontal and closely aligned, thereby allowing frontal safety guard 50 to pivot under and rearward relative to bumper 14 upon engagement, direct or otherwise, with a fixed object, such as a curb. This pivoting is generally illustrated in FIG. 3 based on the application of a force in the direction of arrow A. Therefore, with such a force, central guard portion 55, along with side extensions 57 and 58, pivot in unison relative to bumper 14 about a first axis which is substantially horizontal as represented by line H in this figure. However, once the force is withdrawn, frontal safety guard 50 automatically pivots to it's operational position of FIG. 1 under the force of the springs associated with hinged mounting assemblies 80-83. Therefore, at least one member (e.g., a hinge mounting assembly 80-83) both biases the frontal safety guard 50 to a forward operational position and provides a dampening effect against movement by the frontal safety guard 50. Of course, depending on the magnitude of the force in direction A (note the body of A can generically represent an animate or inanimate object), the force may not overcome the biasing forces of the springs, or may only partially deflect frontal safety guard 50, such as will occur if a person destined to go under bus 8 engages frontal safety guard 50.

Figure 4:
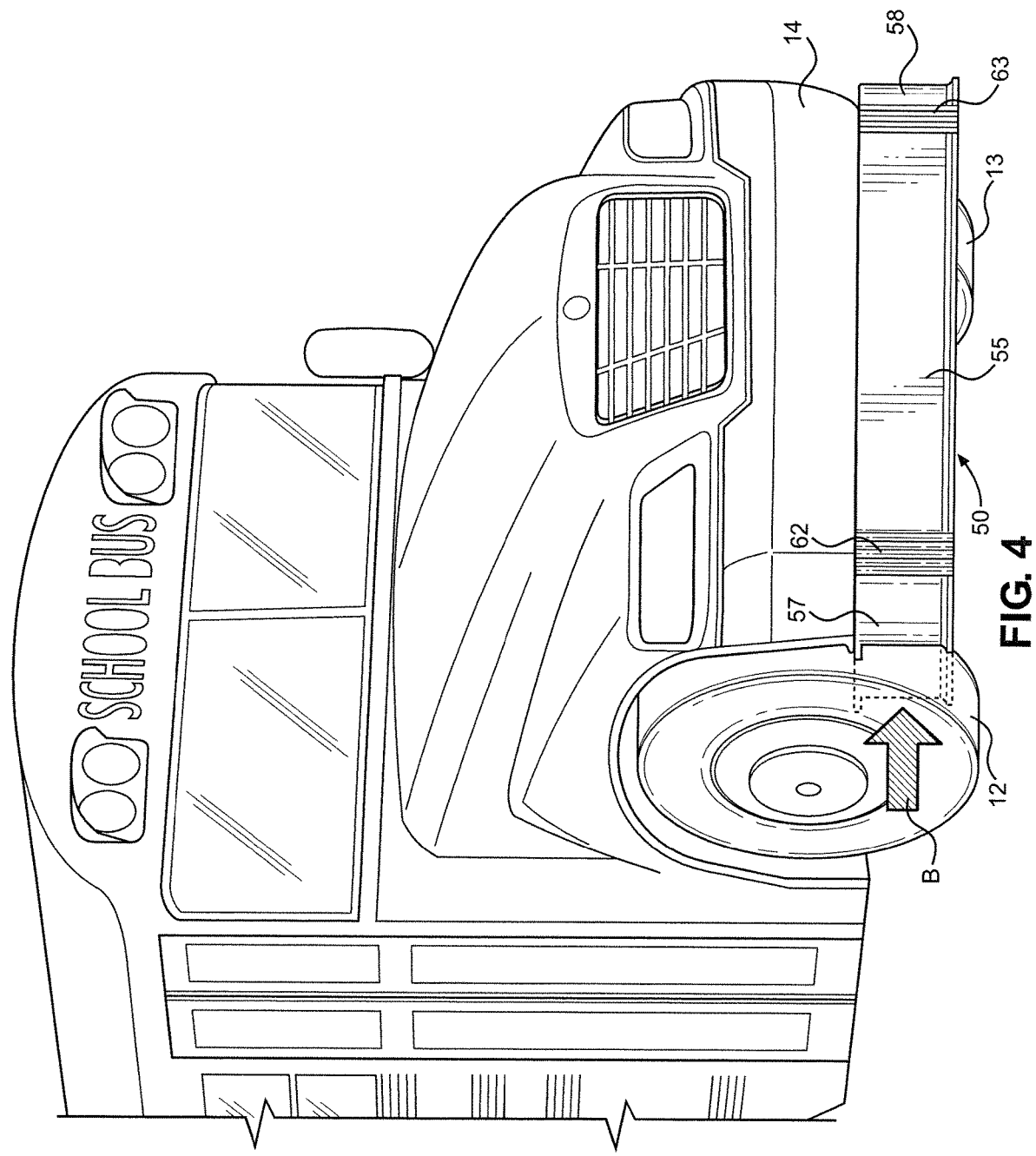
FIG. 4 is a perspective view of a front portion of the school bus of FIG. 1 illustrating deflection of a side extension of the frontal safety guard.

Reference will now be made to FIG. 4 in describing a further operational action associated with frontal safety guard 50. As presented, side extensions 57 and 58 extend laterally outwardly of front wheels 12 and 13, respectively, at least when wheels 12 and 13 are heading in a straight direction or only angled for a minor turn. If bus 8 were to encounter an object, such as a mounting post for a stop sign or a guard rail which directly abuts, for example, side extension 57, side extension 57 can pivot inwardly relative to central guard portion 55. More particularly, each side extension 57, 58 is attached to central guard portion 55 for pivotal movement about a substantially vertical axis. Due to the inclusion of accordion members 62, 63, this relative pivotal movement can be accommodated. Therefore, in addition to the overall frontal safety guard 50 being pivotal relative to bumper 14 about a first, substantially horizontal axis, each side extension 57, 58 is separately pivotable relative to both central guard portion 55 and bumper 14, specifically about respective second and third vertical axes as evident more fully below.

Figure 5:
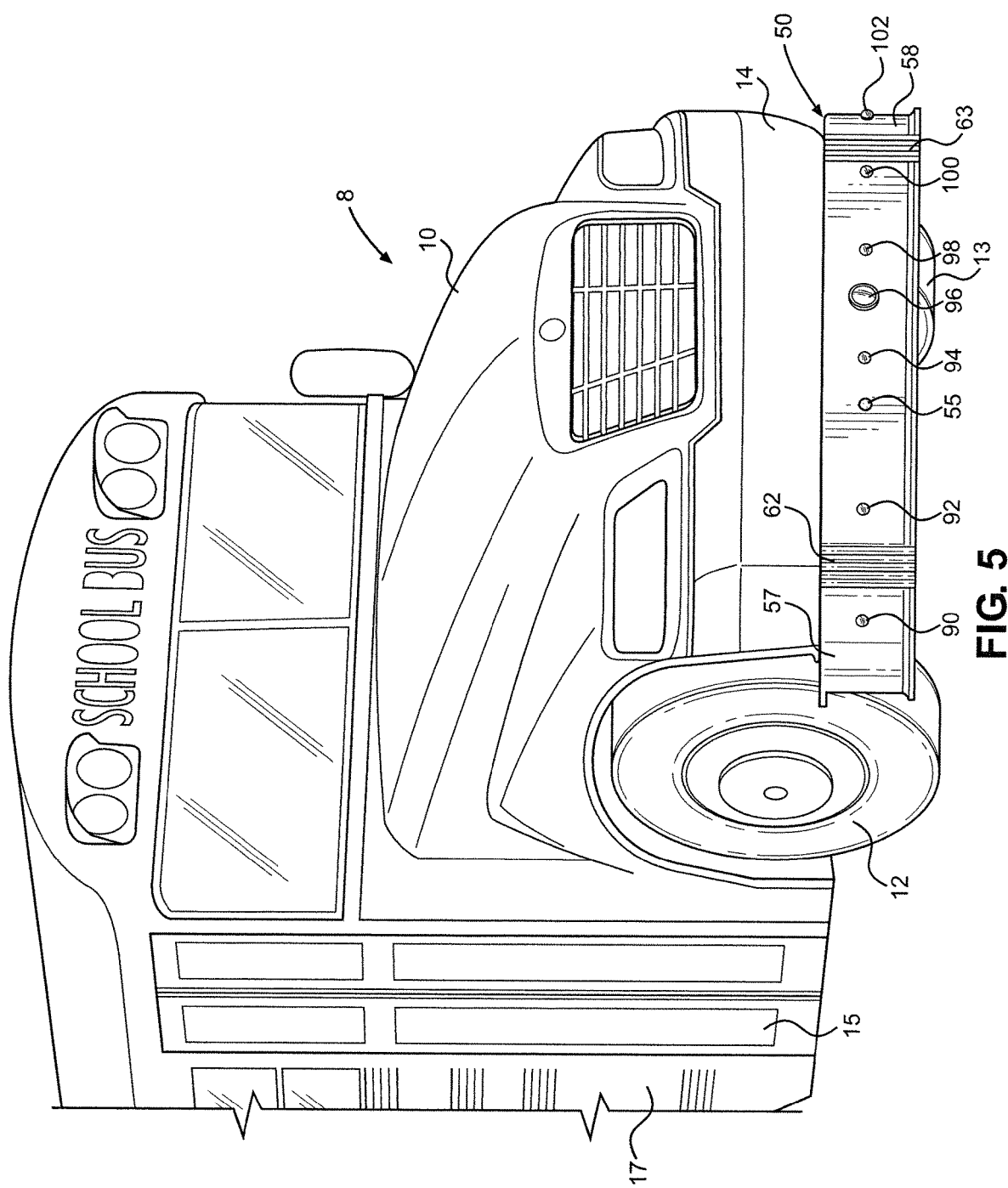
FIG. 5 is a schematic view of a safety control accessories employed in connection with the safety frontal guard of the invention.

FIG. 5 illustrates some peripheral aspects of the invention including the provision of providing additional safety, communication and like features associated with frontal safety guard 50. In particular, generically shown are an angled side camera 90 mounted on side extension 57, a light 92 mounted adjacent accordion 62, a front-directed camera 94, a speaker 96, a radar sensor 98, a microphone 100 and another angled side camera 102. In general, cameras 90, 94 and 102 can be used to sense objects coming close to frontal safety guard 50 in order to warn the driver of vehicle 2, light 92 can provide a visual warning to individuals becoming alarmingly close to frontal safety guard 50, speaker 96 can be utilized in connection with a microphone employed by the driver of vehicle 2 to warn individuals in the vicinity of the bus, radar sensor 98 can actually sense impending objects, and microphone 100 can be utilized to provide audible warning signals to the driver from anyone close to, or in engagement with, frontal safety guard 50.

Figure 6:
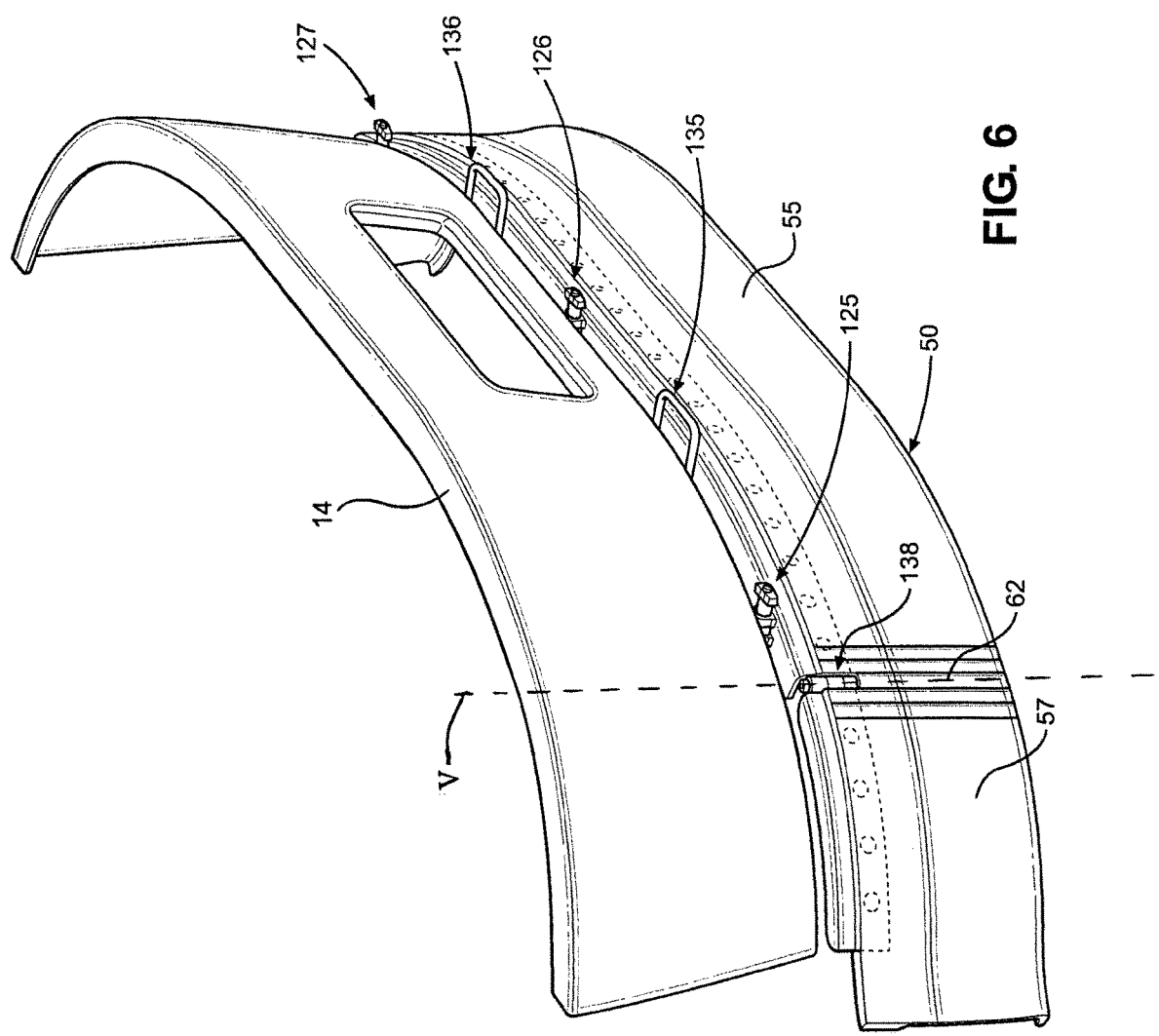
FIG. 6 is an exploded view illustrating quick release connection between the frontal safety guard and vehicle bumper in accordance with the invention.
Figure 7:
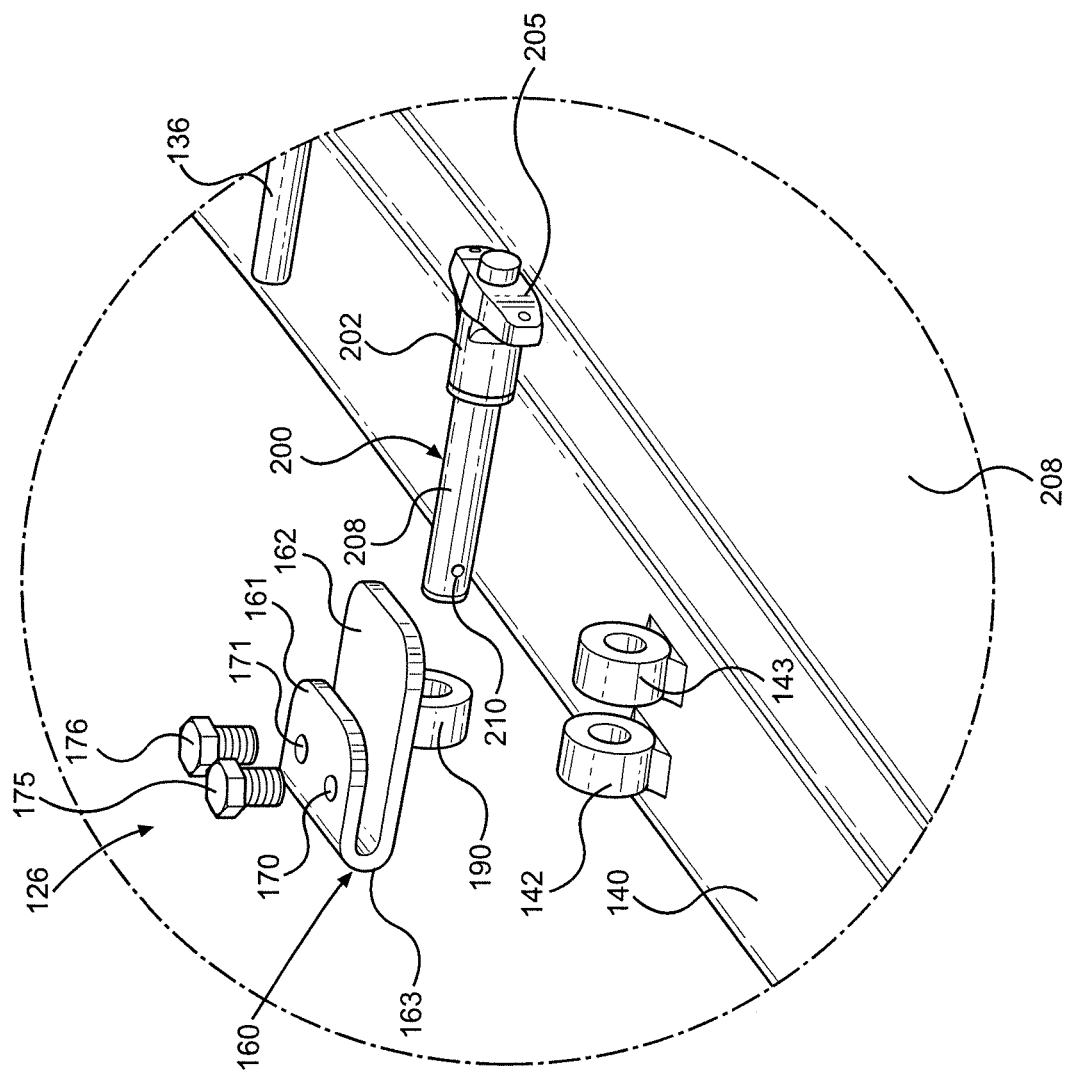
FIG. 7 is an exploded view of a preferred quick release mechanism.

In connection with another aspect of the invention, it is possible to employ quick-release connections in mounting frontal safety guard 50 to bumper 14. With reference to FIGS. 6 and 7, one preferred embodiment is presented which shows quick-release mechanisms 125, 126 and 127 interposed between the plate mounting central guard portion 55 of frontal safety guard 50 to bumper 14. In addition, handles 135 and 136 are provided to readily assist someone to grasp and maneuver frontal safety guard 50. Prior to further detailing the quick release arrangement, it should be noted that FIG. 6 clearly depicts the vertical hinge 138 establishing a second, vertical axis V, which is substantially perpendicular to the substantially horizontal first axis H of FIG. 3, for side extension 57, as well as each side extension 57, 58 including a terminal end portion having a rearwardly and outwardly curved configuration such that the side extension 57, 58 will actually deflect an animate or inanimate object laterally outward and away from a respective front vehicle wheel 12, 13.

In connection with the quick-release mechanisms, FIG. 7 is particularly referenced in connection with quick-release mechanism 126 and it should be understood that quick-release mechanisms 125 and 127 are similarly constructed. As shown, the plate to be mounted to bumper 14 is indicated at 140 and has fixed thereto a pair of spaced, aligned loop members 142 and 143. The quick-release connection 126 also includes an attaching bracket 160 having an upper plate 161, a lower plate 162 and a connecting spacer plate portion 163. Upper plate 161 is provided with a pair of spaced apertures 170 and 171 which are adapted to threadably receive bolts 175 and 176. In addition, lower plate 162 has extending therefrom another loop member 190 which is designed to fit axially between loop members 142 and 143. With this arrangement, an aligned opening is created by loop members 142, 190 and 143 and a quick-release pin 200 is adapted to be received in the aligned openings. More specifically, quick-release pin 200 includes a head portion 202 having a handle 205 and a main shaft portion 208 provided with a spring biased retention pin 210 at a terminal end thereof. Upon inserting quick-release pin 200 through the aligned openings, retention pin 210 is deflected inwardly but is able to extend radially outwardly when head 202 abuts loop connector 143.

With this arrangement, frontal safety guard 50 can be attached to bumper 14 with a lower flange portion (not labeled) of bumper 14 being positioned between upper and lower plates 161 and 162 and then bolts 175 and 176 being tightened to clamp frontal safety guard 50 in position. Instead of this clamping arrangement, bolts 175 and 176 could readily extend through both upper and lower plates 161 and 162, as well as a portion of bumper 14. In either case, front safety guard 50 is fixedly secured for the relative pivotal movement detailed above. However, if necessary, such as if an object becomes lodged between frontal safety guard 50 and the ground, frontal safety guard 50 can be readily removed from bumper 14 with removal of the quick-release pins 200 by pulling upon handles 205. Thereafter, handles 135 and 136 can be used to maneuver frontal safety guard 50.

Based on the above, it should be readily apparent that the frontal guard of the invention establishes a shroud or spoiler which provides a significant added level of safety against individuals potentially being run over by a vehicle having a rather high frontal ground clearance. The dual pivoting action not only protects against undesirable damage to the frontal safety guard by inanimate objects, but also provides some damping and flexibility which is beneficial if the guard is engaged by an individual. The various safety control elements, particularly the use of motion or visual (camera) sensors, warning lights, a warning speaker, a microphone, radar, and the like, further add to the overall effectiveness of the system. Furthermore, the ability to quickly connection and disconnect the safety guard, preferably manually such as with laterally spaced pins 200 or similar disconnect levers, not only represents a potentially additional level of safety, but assures that any damage to the guard would, at best, only temporarily affect the normal operation of the vehicle.

In any case, although described with reference to preferred embodiments of the invention, it should be readily understood that various changes and/or modifications can be made to the invention without departing from the spirit thereof. For instance, the particular geometry of the guard and/or mounting structure can vary, as well as the materials from which the guard and/or mounting structure are made. Certainly, the safety guard assembly of the invention can be used in combination with other guard structure, such as rear wheel vehicle safety guard structure. In general, the invention is only intended to be limited by the scope of the following claims.

I claim:

1. A vehicle comprising:
    a body having a front portion including a front bumper and a side panel;
    a pair of front steerable wheels spaced in a transverse direction of the body of the vehicle;
    at least one pair of transversely spaced rear wheels which are longitudinally spaced from the front steerable wheels;
    a door provided along the at least one side panel; and
    a frontal safety guard for preventing an individual who slips and falls in front of the vehicle or a loose, large inanimate object located in a path of the vehicle from going under the vehicle, said frontal safety guard being pivotally attached to and extending downward from the bumper, with the frontal safety guard including a central guard portion and side extensions attached to the central guard portion.

2. The vehicle according to claim 1, wherein the frontal safety guard is pivotally attached to the bumper for movement about a substantially horizontal axis such that, upon deflection upon engagement, at least part of the frontal safety guard pivots rearward under the bumper.

3. The vehicle according to claim 2, further comprising at least one member both biasing the frontal safety guard to a forward operational position and providing a dampening effect against rearward movement by the frontal safety guard.

4. The vehicle according to claim 2, wherein the frontal guard portion is hingedly connected, at various spaced, transverse locations, for pivotal movement relative to the bumper about at least a first axis.

5. The vehicle according to claim 1, wherein each of the side extensions is attached to the central body portion for pivotal movement relative to both the central guard portion and the bumper.

6. The vehicle according to claim 5, wherein the side extensions are configured to pivot, against biasing forces, about respective second and third axes.

7. The vehicle according to claim 6, wherein each of the second and third axes extends substantially perpendicular to the first axis.

8. The vehicle according to claim 7, wherein the second and third axes are established by living hinges connecting the side extensions to the central guard portion.

9. The vehicle according to claim 5 wherein, when the vehicle is headed in a straight path, the side extensions extend laterally outward of the front steerable wheels of the vehicle.

10. The vehicle according to claim 9, wherein each said side extension includes a terminal end portion having a rearwardly curved portion.

11. The vehicle according to claim 1, wherein the frontal safety guard incorporates at least two safety control elements, with the safety control elements including motion or visual (camera) sensors, warning lights, and a speaker.

12. The vehicle according to claim 1, further comprising: at least one quick release mechanism for selectively detaching the frontal safety guard from the bumper.

13. The vehicle according to claim 12, wherein the at least one quick release mechanism includes a plurality of manual disconnect levers laterally spaced across the frontal safety guard.

14. A vehicle comprising:
a body having a side panel;
a pair of front steerable wheels spaced in a transverse direction of the body of the vehicle;
at least one pair of transversely spaced rear wheels which are longitudinally spaced from the front steerable wheels;
a door provided along the side panel;
a front bumper; and
a frontal safety guard assembly mounted to and extending downward from the bumper for deflecting animate body parts from in front of the front steerable wheels, said safety guard assembly including:
 a central guard portion mounted to the bumper for pivotal movement relative to the bumper; and
 side extensions extending laterally from opposing end portions of the central guard portion, each of said side extensions being mounted to the bumper through the central guard portion for pivotal movement in unison with the central guard portion relative to the bumper and also mounted to the central guard portion for pivotal movement relative to both the bumper and the central guard portion.

15. The vehicle according to claim 14, wherein central guard portion is mounted to the bumper for pivotal movement about a first, substantially horizontal, axis and the side extensions are pivotally mounted to the central guard portion for pivotal movement about second and third, substantially vertical, axes, respectively.

16. A method of preventing an individual who slips and falls in front of the vehicle or a loose, large inanimate object located in a path of the vehicle from going under the vehicle, said method comprising: pivotally attaching a frontal safety guard, including a central guard portion and side extensions attached to and extending laterally from opposing end portions of the central guard portion, to a front bumper of the vehicle such that the frontal safety guard extends downward from the bumper wherein, when the central guard portion of the frontal safety guard is directly engaged during movement of the vehicle, both the central guard portion and the side extensions pivot in unison relative to the bumper.

17. The method of claim 16, wherein both the central guard portion and the side extensions pivot in unison relative to the bumper pivot about a substantially horizontal axis.

18. The method of claim 17 wherein, when one of the side extension is directly abutted during movement of the vehicle, the one of the side extensions pivots relative to each of the central guard portion and the bumper.

19. The method of claim 18, wherein the one of the side extensions pivots relative to each of the central guard portion and the bumper about a substantially vertical axis.

* * * * *